Sept. 24, 1940.  J. A. SAFFIR  2,215,479
DEVICE FOR PRESERVING LOCAL ANESTHETIC SOLUTIONS
Filed March 7, 1938
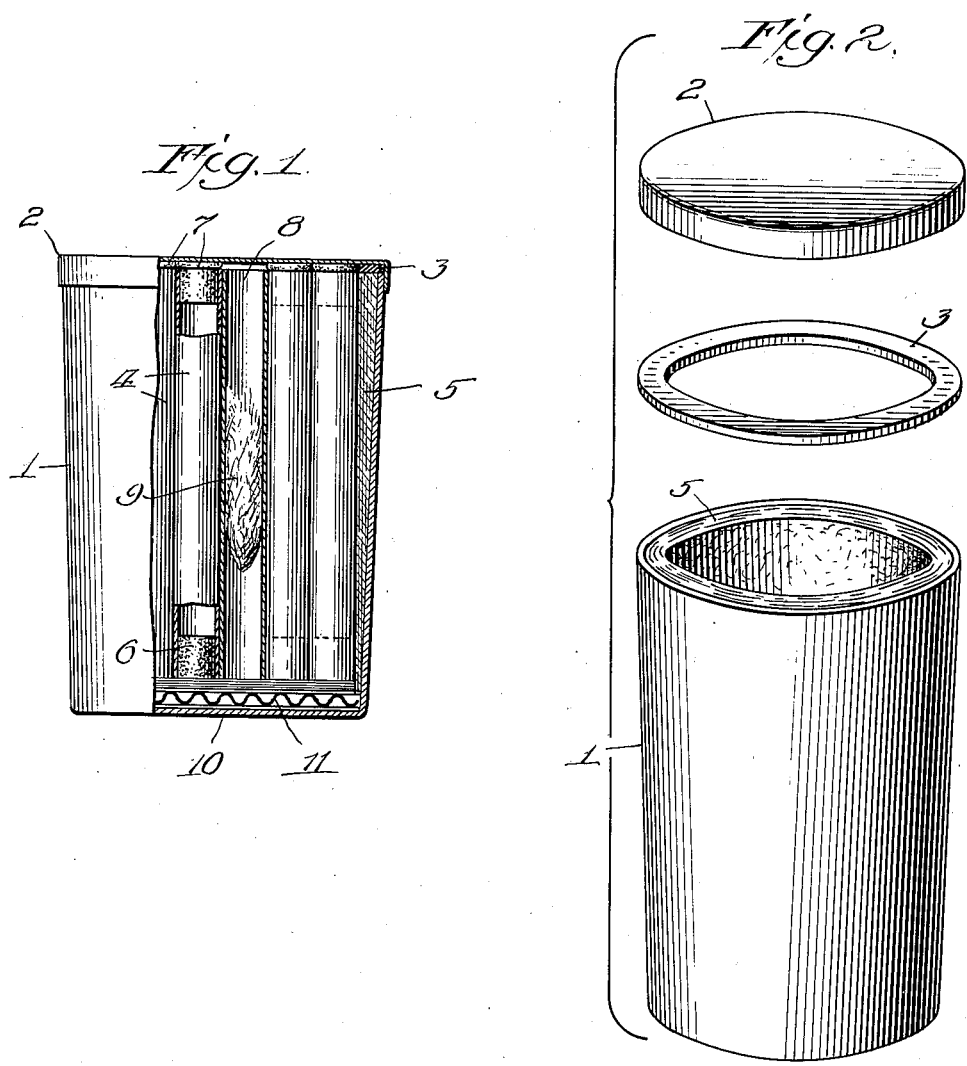
Inventor
Jacob A. Saffir Patented Sept. 24, 1940

2,215,479

UNITED STATES PATENT OFFICE 2,215,479

DEVICE FOR PRESERVING LOCAL ANESTHETIC SOLUTIONS

Jacob A. Saffir, Chicago, Ill., assignor to Jacob William Frankel, Chicago, Ill.

Application March 7, 1938, Serial No. 194,350

5 Claims. (Cl. 206—63.2)

This invention relates to local anesthetics and more particularly to the packaging of local anesthetics which are prepared by the manufacturer at his plant and delivered ready for hypodermic use to the practitioner.

At the present a great percentage of local anesthetic is dispensed in glass tubes or containers suitably stoppered and already containing the anesthetic properly compounded for instant injection by the dentist or user. These glass, stoppered containers are generally referred to as cartridges and will so be designated hereinafter.

The type of local anesthetic in general use by the profession, and more specifically the dental profession, is composed essentially of procaine hydrochloride, approximately 2%, plus epinepherine or equivalent vaso-constrictor drug. The vaso-constrictor drug will vary from 1 part in 20,000 to 1 part in 75,000. These are generally in a physiological salt solution and are dispensed in a cartridge as described above.

The procaine hydrochloride in physiologic salt solution is the active anesthetic and it is its injection that results in anesthesia. Due, however, to the fact that the blood vessels carry away the anesthetic quite rapidly from the area where it is injected, the duration of such anesthesia is very short and fleeting. Therefore, to procure anesthesia over a greater period of time a vaso-constrictor is used with the anesthetic. This acts to locally constrict the blood vessels, thereby creating a form of local anemia which holds the anesthetic in situ over a longer period of time.

These vaso-constrictors are not very stable and under certain conditions may rapidly deteriorate in the solutions in which they appear. For example, any exposure of the liquid to oxygen will cause an oxidation very detrimental to the solution, both physically and chemically. Upon oxidation and deterioration, the solution generally turns brown and is broken up, rendering it less suitable for hypodermic use.

It is well known that the most acceptable package for these preparations is a "cartridge" consisting of a cylindrical glass tube capped at at least one end with a rubber piston, membrane or stopper through which the needle of a conventional hypodermic syringe may be thrust permitting charging of the syringe under substantially ideal aseptic conditions. These rubber stoppers apparently do not absolutely and permanently preclude the access of air to the packaged anesthetic, notwithstanding their liquid-tight character, and, in the course of several months, sufficient atmospheric oxygen diffuses through or past the stopper to impair the effectiveness of the anesthetic.

The prominent concerns which compound and thus package these anesthetic preparations have long recognized this problem of oxidation as a menace to business reputation and an economic burden by reason of the large percentage of replacements necessitated by depreciation of the packaged preparations prior to actual use. As would be expected, various expedients have been devised and suggested as possible solutions for the problem. Among those offered have been the supplemental sealing of the pistons with various substances and superposed instrumentalities. One concern is now "vacuum-packing" a number of such cartridges in an evacuated tin not unlike that employed for the packaging of numerous foodstuffs such as coffee, shortening and the like. While there has been belief that this method of protection should, because of direct reduction in the quantity of air accessible to the permeable cartridge walls, as well as the reduction of air pressure thereon, diminish the rate of deterioration of thus-packaged anesthetic preparations, actual experience (see "The pH of Stock Procaine Solutions," Journal of the American Dental Association, Sept. 1937, pp. 1558–1564) would not seem to corroborate this conclusion.

It is to the appreciable and commercially practical solution of this problem that my invention is directed, and it is, accordingly, the salient object thereof to provide a novel package for highly decomposable liquid anesthetic solutions which is markedly effective for the prolongation of anesthetic shelf life.

Other objects, and objects relating to details and economies of manufacture and use will definitely appear to those skilled in the art upon familiarization with the concepts of my invention. A preferred embodiment of my invention is illustrated in the accompanying drawing, in which:

Figure 1 is a side view of a package constituting one form in which my invention is susceptible of embodiment, a portion of the outer casing of which is shown broken away to reveal the arrangement of the interior component parts thereof; and Fig. 2 is a perspective view of the shell, gasket and closure spacedly depicted as elements of the package illustrated in Fig. 1.

The same reference numerals refer to the same parts throughout the several views.

In a broad sense, my invention may be said to find embodiment in a package for the shipment and storage of delicate liquid anesthetic preparations susceptible to rapid oxidation and impairment by exposure to air, which package comprises a collapse-resistant casing, closure means associated with said casing for hermetically sealing the space therewithin against ingress of external atmospheric air, an oxygen-absorbent gettering element within said hermetically sealed space and having an affinity for free uncombined oxygen adequate to fix the entire quantity ensealed, a charge of liquid anesthetic in the thus-processed space, and means for protecting the charge of anesthetic against contamination by the gettering agent during the most severe conditions of package inversion and agitation normal to shipment of pharmaceuticals.

Of a number of oxygen-getters employed and tested for use in my anesthetic package, the di- and tri-hydroxy benzene compounds have been found especially suitable. More specifically, pyrocatechol resorcinol, hydroquinone, hydroxyhydroquinone, phloroglucinol and pyrogallol have established effectiveness for my purposes. The great affinity of the last-mentioned of these reducing agents in alkaline aqueous solution is well recognized, as is its extremely toxic nature, particularly as it affects the human skin and circulatory system. Accordingly, and by reason of the hypodermic field of use for the local anesthetic preparations with which I am herein concerned, the prevention of contamination by the reducing agent, under all expected conditions of rough handling in shipment, assumes great importance as a feature of the present invention.

Having thus set forth some of the basic concepts of my invention, I refer now to the accompanying drawing and to the preferred structural embodiment of my invention therein illustrated.

The outer casing 1 of the package, formed of metal, synthetic resin, glass or other impervious material, is hermetically sealed against ingress of atmospheric air by a closure 2 provided with a suitable sealing gasket 3 preferably formed of soft rubber. Within, and preferably centrally located with respect to the casing 1, is a glass tube 8 open at each end to the air space defined by the casing 1 and closure 2, and, concentrically arranged about the tube 8 in the form of two annuluses, are disposed a multiplicity of cylindrical cells 4 of cartridge-like form within each of which cells is contained a charge of local anesthetic solution of the delicate type previously described. Each of the cells 4 of the package is closed at one end with a rubber stopper or piston 6 and at the other end by a rubber diaphragm 7 capable of puncture by the conventional needle of a hypodermic syringe, whereby the anesthetic preparation may be withdrawn for hypodermic use under highly aseptic conditions. Suitable padding 5, of soft paper or the like, and a corrugated paper supporting disc 11 serve as stuffers within the casing 1 and maintain the several cells 4, 8, in the snug packaged contact illustrated.

Within the glass tube 8 is disposed a wad 9 of cotton or similar liquid-retentive material and this wad is impregnated, just prior to application and sealing of the closure 2 to the casing 1, with approximately $\frac{1}{10}$ of one cubic centimeter of pyrogallol in conventional aqueous solution. The closure 2 and gasket 3 are then promptly applied to the casing 1 and the entire package placed in a vacuumizing chamber through the operation of which as much as 98% of the initially contained air may be withdrawn from the package. This withdrawal of air will, where a gasketed cap 2 of the type illustrated is employed, serve to maintain hermeticity of closure by the differential pressures within and without the container. Moreover, because of the reduction in the quantity of contained air, the amount of free uncombined oxygen to be reacted with the pyrogallol is far less, and a correspondingly lesser quantity of this oxygen-absorbent substance is required. In the case of a thus-evacuated package of the size and air space illustrated, $\frac{1}{10}$ of one cubic centimeter of pyrogallol has been found entirely adequate to produce anesthetic protection for periods well over one year, even under severe climatic conditions. In packages of large or smaller size, different internal arrangement, more or less evacuation, or employing oxygen-fixing substances other than pyrogallol, the quantity of the reducing agent or oxygen getter may vary accordingly. Three factors which especially contribute to the reduction of the amount of pyrogallol necessary in the illustrated package are compactness of arrangement of the cells 4 and 8, high vacuumization, and the continuity of the air spaces within the package which permits facile diffusion of the residual air throughout the package and into contact with the pyrogallol retained in the open getter cell comprised by elements 8 and 9.

With anesthetic so packaged, deterioration is not begun so readily on the dealer's shelves and during transportation. This not only makes for great savings to the manufacturer but also ensures the dentist of a solution that will be more constantly fresh in the sense that the vaso-constrictor better withstands the hitherto-accepted deterioration with age.

In compliance with the requirements of the patent statutes I have herein shown and described a few preferred embodiments of my invention. It is, however, to be understood that the invention is not limited to the precise arrangements herein shown, the same being merely illustrative of the principles of my invention. What I consider new and desire to secure by Letters Patent is:

1. A package for the shipment, storage and dispensing of hypodermic anesthetic solutions susceptible to rapid oxidation and impairment by exposure to the air, comprising: a collapse-resistant casing, closure means associated with said casing for hermetically sealing the space therewithin against ingress of external atmospheric air, an oxygen-absorbent gettering element within said hermetically-sealed space and having a free-oxygen affinity adequate to fix the uncombined oxygen ensealed within said space, a quantity of liquid anesthetic substance disposed within the gettered space enclosed by said casing, and means for protecting said liquid anesthetic against contamination by said gettering element during shipping conditions of package inversion and agitation and contamination by external atmospheric air during unpackaging, comprising an anesthetic cell within said gettered space the wall structure of which cell is penetrable with the needle of a conventional hypodermic syringe, impermeable to both getter element and liquid anesthetic and sufficiently gas-tight to preclude oxidation of the contained anesthetic during the normal period required for unpackaging of the anesthetic preparation.

2. A package for the shipment and storage of liquid anesthetic preparations susceptible to rapid oxidation and impairment by exposure to the air, comprising: a collapse-resistant casing, closure means associated with said casing for hermetically sealing the space therewithin against ingress of external atmospheric air, a quantity of liquid oxygen-absorbent substance within said hermetically-sealed space and having a free-oxygen affinity adequate to precipitate the uncombined oxygen ensealed within said space, a quantity of liquid anesthetic substance disposed within said hermetically-sealed space, and means for segregating said two liquid substances against inter-contamination even under severe shipping conditions of package inversion and agitation comprising a liquid-impervious cell within said sealed casing and containing said anesthetic and a gas-permeable liquid-retentive cell similarly disposed within said sealed casing and charged with said quantity of liquid oxygen-absorbent substance.

3. A package for the shipment, storage and dispensing of hypodermic anesthetic solutions susceptible to rapid oxidation and impairment by exposure to the air, comprising: a cup-like casing, closure means associated with said casing for hermetically sealing the space therewithin against ingress of external atmospheric air, an oxygen-absorbent gettering element within said hermetically sealed space and having a free-oxygen affinity adequate to fix the uncombined oxygen ensealed within said space, a quantity of liquid anesthetic substance disposed within the gettered space enclosed by said casing, and means for protecting said liquid anesthetic against contamination by said gettering element even under severe shipping conditions of package inversion and agitation as well as contamination by external atmospheric air during unpackaging, comprising a divisible multi-cellular wall structure constituted by a plurality of contiguous anesthetic-containing stoppered tubes snugly-fitted within said cup-like closured casing and enveloped by a series of inter-communicating spaces the therein-disposed air of which is free to circulate into oxygen-precipitating contact with said gettering element.

4. A package for the shipment and storage of hypodermic anesthetic solutions susceptible to rapid oxidation and impairment by exposure to the air, comprising: a cup-like casing, closure means associated with said casing for hermetically sealing the space therewithin against ingress of external atmospheric air, a plurality of liquid-tight stoppered cylindrical tubes parallelly arranged in annular formation within said casing, a charge of anesthetic solution within each of said tubes, and means for protecting the contents of each of said tubes against oxidation by diffusion of casing-ensealed air past the tube stoppers comprising an open-ended tube contiguously centrally fitted within the annulus defined by said stoppered tubes and a mass of liquid-retentive fibrous material wadded within said open-ended tube and impregnated with a quantity of chemically-active substance capable of precipitating the free uncombined oxygen ensealed within said hermetically-sealed casing space.

5. A package for the shipment and storage of hypodermic anesthetic solutions susceptible to rapid oxidation and impairment by exposure to the air, comprising: a cup-like casing, closure means associated with said casing for hermetically sealing the space therewithin against ingress of external atmospheric air, a plurality of liquid-tight stoppered cylindrical tubes parallelly arranged in annular formation within said casing, a charge of anesthetic solution within each of said tubes, and means for protecting the contents of all of said tubes against oxidation by diffusion of casing-ensealed air past the tube stoppers comprising an open-ended tube contiguously centrally fitted within the annulus defined by said stoppered tubes and a mass of liquid-retentive fibrous material snugly wadded within said open-ended tube and impregnated with a small quantity of pyrogallic substance having an oxygen-absorbent capacity adequate to withdraw and fix against circulation substantially the entire free oxygen content ensealed within said hermetically-sealed casing space.

JACOB A. SAFFIR.